(12) United States Patent
Chou et al.

(10) Patent No.: US 7,843,082 B2
(45) Date of Patent: Nov. 30, 2010

(54) ISLANDING DETECTION APPARATUS FOR A DISTRIBUTED GENERATION POWER SYSTEM AND DETECTION METHOD THEREFOR

(75) Inventors: Hung-Liang Chou, Kaohsiung (TW); Wen-Jung Chiang, Kaohsiung (TW); Chin-Chang Wu, Kaohsiung (TW); Ya-Tsung Feng, Kaohsiung (TW)

(73) Assignee: Ablerex Electronics Co., Ltd., Hsintein (TW)

( * ) Notice: Subject to any disclaimer, the term of this patent is extended or adjusted under 35 U.S.C. 154(b) by 881 days.

(21) Appl. No.: 11/546,277

(22) Filed: Oct. 12, 2006

(65) Prior Publication Data
US 2007/0103004 A1 May 10, 2007

(30) Foreign Application Priority Data
Nov. 10, 2005 (TW) ............................... 94139432 A
May 19, 2006 (TW) ............................... 95117835 A (51) Int. Cl.
*H02J 9/00* (2006.01)
(52) U.S. Cl. ..................... 307/64; 307/102; 307/103
(58) Field of Classification Search ................ 307/64, 307/102, 103
See application file for complete search history.

(56) References Cited

U.S. PATENT DOCUMENTS

| 5,493,485 | A | 2/1996 | Okado |
| 6,172,889 | B1 | 1/2001 | Eguchi et al. |
| 6,603,290 | B2 * | 8/2003 | Hochgraf ..................... 322/37 |
| 7,016,793 | B2 | 3/2006 | Yet et al. |
| 7,106,564 | B2 | 9/2006 | Deng et al. |
| 2001/0056330 | A1 * | 12/2001 | Wills ........................... 702/60 |
| 2004/0021470 | A1 * | 2/2004 | Adams et al. ............... 324/522 |
| 2004/0070281 | A1 * | 4/2004 | Lineberger ................... 307/85 |

FOREIGN PATENT DOCUMENTS

TW 430731 4/2001

* cited by examiner

*Primary Examiner*—Fritz M Fleming
(74) *Attorney, Agent, or Firm*—Alan Kamrath; Kamrath & Associates PA (57) ABSTRACT

An islanding detection apparatus for a distributed generation power system and a detection method therefor operates a power converter to act as a virtual capacitor or inductor at a frequency close to but unequal to that of a utility power system under abnormal condition of the utility power system. When power failure occurs in the utility power system, only the distributed generation power system supplies power to a load so that a load voltage has been changed in at least one of amplitude and frequency which can be immediately detected islanding phenomenon.

12 Claims, 4 Drawing Sheets

ISLANDING DETECTION APPARATUS FOR A DISTRIBUTED GENERATION POWER SYSTEM AND DETECTION METHOD THEREFOR

BACKGROUND OF THE INVENTION

1. Field of the Invention

The present invention relates to an islanding detection apparatus for a distributed generation power system and a detection method therefor. Particularly, the present invention relates to the islanding detection apparatus employing a power converter to connect with a utility power system for detecting power failure of the utility power system. More particularly, the present invention relates to the islanding detection apparatus used to disconnect the distributed power system from the utility power system for avoiding islanding operation.

2. Description of the Related Art

Generally, small capacity distributed generation power systems such as small capacity power stations or renewable power stations serve in some energy markets. Currently, renewable energies suitable for generating electric power include solar power, wind power and fuel cell power etc. In the future various types of small capacity power stations will be incorporated into an ordinary distributed generation power system.

The small capacity distributed generation power systems are directly incorporated into a utility power system for supplying electric power to loads. Conventionally, there are some protective methods for the distributed power system, including detection for electric power quality and islanding operation of a distributed generation power system. A phenomenon so-called "islanding operation" is that a utility power system may be cut off due to the power failure or maintenance of electrical equipments, but a small capacity distributed generation power system can still supply electric power as usual. Accordingly, this may cause distributed generation power systems to be supplied electric power individually. Many problems caused by the phenomenon of islanding operation are given as follows:

1. Islanding operation may jeopardize public security or endanger maintenance workers working in the area of the distributed generation power system;
2. Islanding operation may cause unregulated voltage and frequency of electric power of the distributed generation power system so that electrical components and equipments located in the area of the distributed generation power system may be damaged;
3. Islanding operation may cause malfunction of protection relays located in the area of the distributed generation power system; and
4. Once the utility power system is re-supplying electric power, islanding operation may cause asynchronous problem of electric power between the distributed generation power system and the utility power system.

Hence, many islanding operation control standards, such as IEEE929, IEEE1547, VDE0126 and UL1741 etc., have been established in Europe, United State of America, Japan and other international countries.

The detection methods for islanding operation can be divided into an active detection method and a passive detection method. The passive detection methods are used to detect changes in parameters of a power system for determining whether the islanding operation occurs. For example, the passive detection methods include a system-frequency detection method, a voltage-amplitude detection method, a harmonic-contained detection method and so on. However, there is a dead-zone existing in these passive detection methods. The term "dead-zone" means a situation that these passive detection methods cannot detect islanding operation occurring in the power system. Accordingly, these passive detection methods cannot meet the requirements of the islanding control standards.

As to the active detection method, a small fluctuation is added in an output current of the distributed generation power system. When the utility power system is normal, the small fluctuation cannot affect the distributed generation power system due to the strong utility power system. Conversely, when the utility power source is interrupted, the small fluctuation can cause a great change in frequency or voltage. In this way, a protection relay can immediately detect such a change and judge it as islanding operation. Instantly, the distributed generation power system must be disconnected from the utility power system so as to avoid occurrence of islanding operation.

A conventional active detection method described in U.S. Pat. No. 5,493,485 discloses the islanding detection for the distributed generation power system by means of its phase shift and harmonic distortion. Accordingly, an occurrence of the islanding operation in the distributed generation power system can be detected. Another conventional active detection method described in U.S. Pat. No. 6,172,889 discloses the islanding detection for the distributed generation power system by generating a frequency shift in an output current of the distributed generation power system. Accordingly, an occurrence of the islanding operation in the distributed generation power system can be detected by a positive feedback manner. Another conventional active detection method described in Taiwanese Patent Publication No. 430,731 discloses the islanding detection for the distributed generation power system by generating an asymmetric output current of the distributed generation power system. Accordingly, an occurrence of the islanding operation in the distributed generation power system can be detected. Another conventional active detection method described in U.S. Pat. No. 6,603,290 discloses the islanding detection by generating an amount of harmonics in the output current of the distributed generation power system. Accordingly, an occurrence of the islanding operation in the distributed generation power system can be detected by measuring impedance of the distributed generation power system.

As have been discussed above, these active detection methods employ a small distortion in the output current of the distributed generation power system. In this way, the islanding operation in the distributed generation power system due to power interruption of the utility power system can be detected. Nevertheless, these active detection methods must comply with all international islanding control standards such that total harmonic distortion of a current supplied from the distributed generation power system must be less than 5%. Hence, the harmonic distortion resulted from these active detection methods must be restricted by the islanding control standards so that detection time of islanding detection is increased and operating reliability is affected. However, there is a dead-zone also existing in these active detection methods. Furthermore, a control method employed in these active detection methods may be sophisticated.

The present invention intends to provide an islanding detection apparatus and a detection method to act a distributed power system as virtual impedance under abnormal condition of the utility power system. The virtual impedance is operated at a frequency close to but unequal to that of a utility power system. When the utility power system is normal, a voltage of the utility power system is identical with that of a load. In this manner, the distributed generation power system generates a real power, and its output current is a sine-wave signal whose frequency and phase are identical with those of a voltage of the utility power system to comply with islanding control standards. Since the utility power system is strong enough and excluded the operating frequency of the virtual impedance, an output current of the distributed generation power system is unaffected. But, conversely, when the utility power system is abnormal or power failure occurs in the utility power system, the strong utility power system is inexistent and there is no longer supplying the fixed operating frequency of the voltage to the load. Hence, there is only the distributed generation power system supplying power to the load so that the distributed generation power system acting as the virtual impedance is enabled. In response to the affection of the distributed generation power system, the operating frequency or amplitude of the load voltage is significantly changed. Accordingly, the islanding operation of the distributed generation power system is detected and thus the distributed generation power system is disconnected from the utility power system. In comparison with these conventional active detection methods, the detection method of the present invention can reduce a detection time of islanding phenomenon and the output current distortion of the distributed generation power system, and can increase the operating reliability.

SUMMARY OF THE INVENTION

The primary objective of this invention is to provide an islanding detection apparatus for a distributed generation power system and a detection method therefor. The distributed generation power system connects with a utility power system for supplying power to a load. A power converter provided in the distributed generation power system acts as virtual impedance under abnormal condition of the utility power system. The virtual impedance is operated at a frequency close to but unequal to that of a utility power system. When the utility power source is normal, a voltage of the utility power system is identical with that of the load. Since the utility power system is strong enough and excluded the operating frequency of the virtual impedance, an output current of the distributed generation power system is unaffected. But, conversely, when the utility power system is abnormal or power failure occurs in the utility power system, the strong utility power system is inexistent and there is no longer supplying the fixed operating frequency of the voltage to the load. Hence, there is only the distributed power system supplying power to the load so that the distributed generation power system acting as the virtual impedance is enabled. In response to the affection of the distributed generation power system, one or both of the operating frequency and amplitude of the load voltage will be significantly changed. Accordingly, the islanding operation of the distributed generation power system is detected. Consequently, it can reduce the detection time of islanding phenomenon and the output current distortion of the distributed generation power system, and can increase the operating reliability of the distributed generation power system.

The islanding detection apparatus for the distributed generation power system controls the power converter to act as a virtual capacitor or inductor under abnormal condition of the utility power system. The virtual capacitor or inductor is operated at a frequency close to but unequal to that of the utility power system. When the utility power source is normal, the voltage of the utility power system is identical with that of the load. Since the utility power system is strong enough and excluded the operating frequency of the virtual capacitor or inductor, an output current of the distributed generation power system is unaffected. But, conversely, when the utility power system is abnormal or power failure occurs in the utility power system, the strong utility power system is inexistent and there is no supplying fixed operating frequency of the voltage to the load. Hence, there is only the distributed generation power system supplying power to the load so that the virtual capacitor or inductor is enabled. In response to the affection of the distributed generation power system, one or both of the operating frequency and amplitude of the load voltage will be significantly changed. Accordingly, the islanding operation of the distributed power system is detected. Consequently, it can reduce the detection time of islanding phenomenon and the output current distortion of the distributed generation power system, and can increase the operating reliability of the distributed generation power system.

In a separate aspect of the present invention, the islanding detection apparatus for the distributed generation power system controls the power converter to act as a virtual capacitor under abnormal condition of the utility power system. The virtual capacitor is operated at a frequency close to but unequal to that of the utility power system. When the utility power system is abnormal or power failure occurs in the utility power system, the strong utility power system is inexistent and there is no supplying fixed operating frequency of the voltage to the load. Hence, there is only the distributed generation power system supplying power to the load so that the virtual capacitor is enabled. In response to the affection of the distributed generation power system, one or both of the operating frequency and amplitude of the load voltage will be significantly changed. Accordingly, the islanding operation of the distributed power system is detected. Consequently, it can reduce the detection time of islanding phenomenon and the output current distortion of the distributed generation power system, and can increase the operating reliability of the distributed generation power system.

In a further separate aspect of the present invention, the islanding detection apparatus for the distributed generation power system controls the power converter to act as a virtual inductor under abnormal condition of the utility power system. The virtual inductor is operated at a frequency close to but unequal to that of the utility power system. When the utility power system is abnormal or power failure occurs in the utility power system, the strong utility power system is inexistent and there is no supplying fixed operating frequency of the voltage to the load. Hence, there is only the distributed generation power system supplying power to the load so that the virtual inductor is enabled. In response to the affection of the distributed generation power system, one or both of the operating frequency and amplitude of the load voltage will be significantly changed. Accordingly, the islanding operation of the distributed power system is detected. Consequently, it can reduce the detection time of islanding phenomenon and the output current distortion of the distributed generation power system, and can increase the operating reliability of the distributed generation power system.

In a yet further separate aspect of the present invention, the detection method for the distributed generation power system includes the steps of: controlling the power converter of the distributed generation power system to act as a virtual capacitor at a frequency close to but unequal to that of the utility power system; when the utility power system is abnormal or power failure occurs in the utility power system, only the distributed generation power system supplies power to the load so that the virtual capacitor is enabled and one or both of the operating frequency and amplitude of the load voltage will be significantly changed.

In a yet further separate aspect of the present invention, the detection method for the distributed generation power system includes the steps of: controlling the power converter of the distributed generation power system to act as a virtual inductor at a frequency close to but unequal to that of the utility power system; when the utility power system is abnormal or power failure occurs in the utility power system, only the distributed generation power system supplies power to the load so that the virtual inductor is enabled and one or both of the operating frequency and amplitude of the load voltage will be significantly changed.

In a yet further separate aspect of the present invention, the detection method for the distributed generation power system includes the steps of: connecting the distributed generation power system with a utility power system, wherein the distributed generation power system has a DC power source and a power converter; controlling the power converter to act as a virtual impedance under abnormal condition of the utility power system such that the virtual impedance is operated at a frequency close to but unequal to that of the utility power system; when the utility power source is normal, a voltage of the utility power system is identical with that of the load and an output current of the distributed generation power system is unaffected; conversely, when the utility power system is abnormal or power failure occurs in the utility power system, only the distributed power system supplying power to the load so that the distributed generation power system acting as the virtual impedance is enabled and one or both of the operating frequency and amplitude of the load voltage will be significantly changed.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
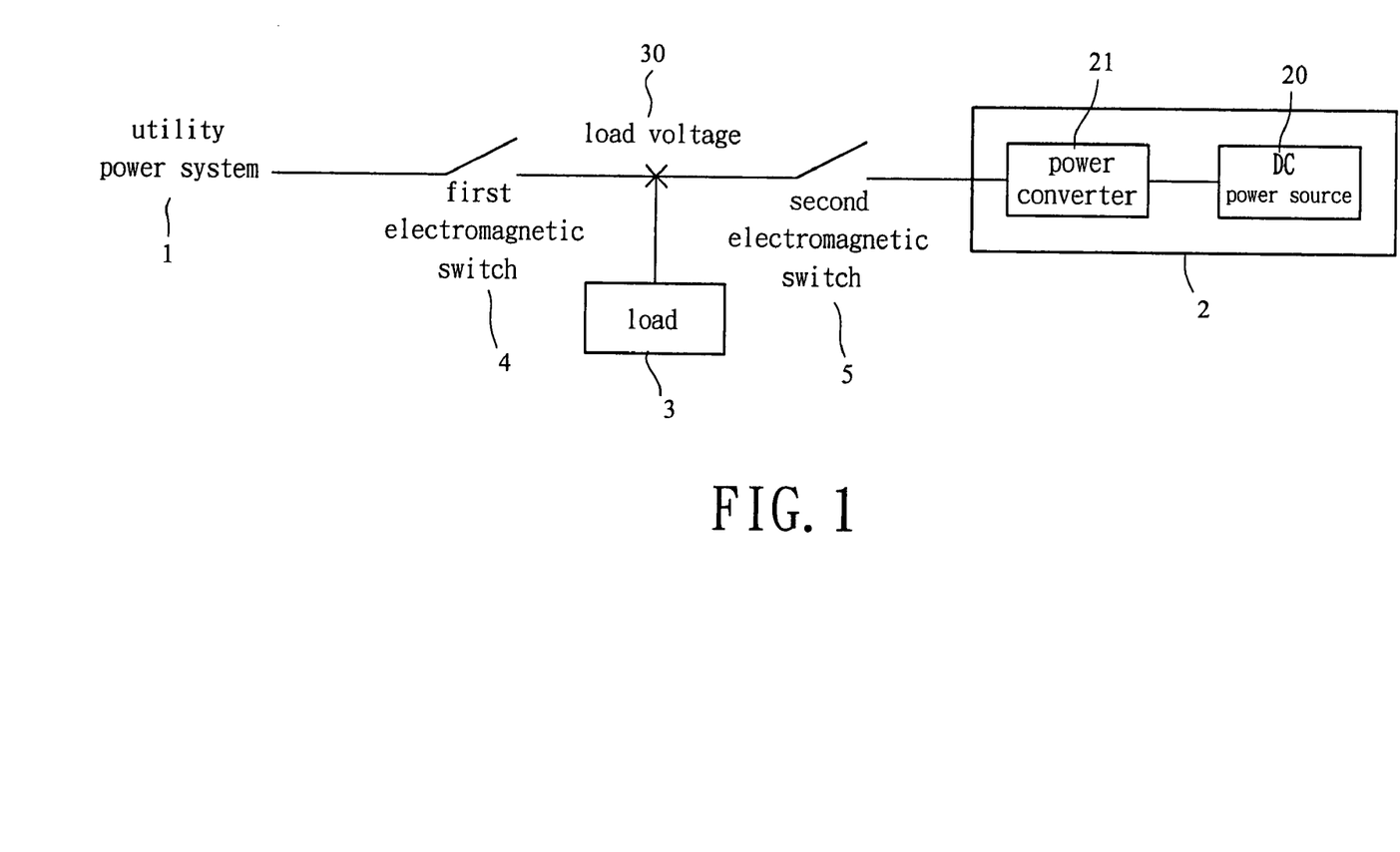
FIG. 1 is a block diagram illustrating an islanding detection apparatus applied to a combination of a utility power system and a distributed generation power system in accordance with the present invention.

Referring now to FIG. 1, a block diagram of an islanding detection apparatus applied to a combination of a utility power system and a distributed generation power system in accordance with the present invention is illustrated. The utility power system 1 is adapted to supply a fixed frequency of an AC power. The distributed power system 2 includes a DC power source 20 and a power converter 21, wherein the DC power source 20 can be selected from a solar-energy cell, a fuel cell, an output voltage of an AC/DC converter for a wind power generator or other renewable energy sources. The power converter 21 is adapted to convert a DC voltage into an AC current for supplying the AC power to a load 3 or the utility power system 1. The utility power system 1 and the distributed generation power system 2 are connected in parallel via a first electromagnetic switch 4 and a second electromagnetic switch 5 which are used to supply a load voltage 30. The first electromagnetic switch 4 is connected between the utility power system 1 and the load 3 and is used to disconnect the utility power system 1. Similarly, the second electromagnetic switch 5 is connected between the distributed generation power system 2 and the load 3 and is used to disconnect the distributed generation power system 2. Preferably, the first electromagnetic switch 4 and the second electromagnetic switch 5 are selected from solid-state switches or other type switches.

Figure 1A:
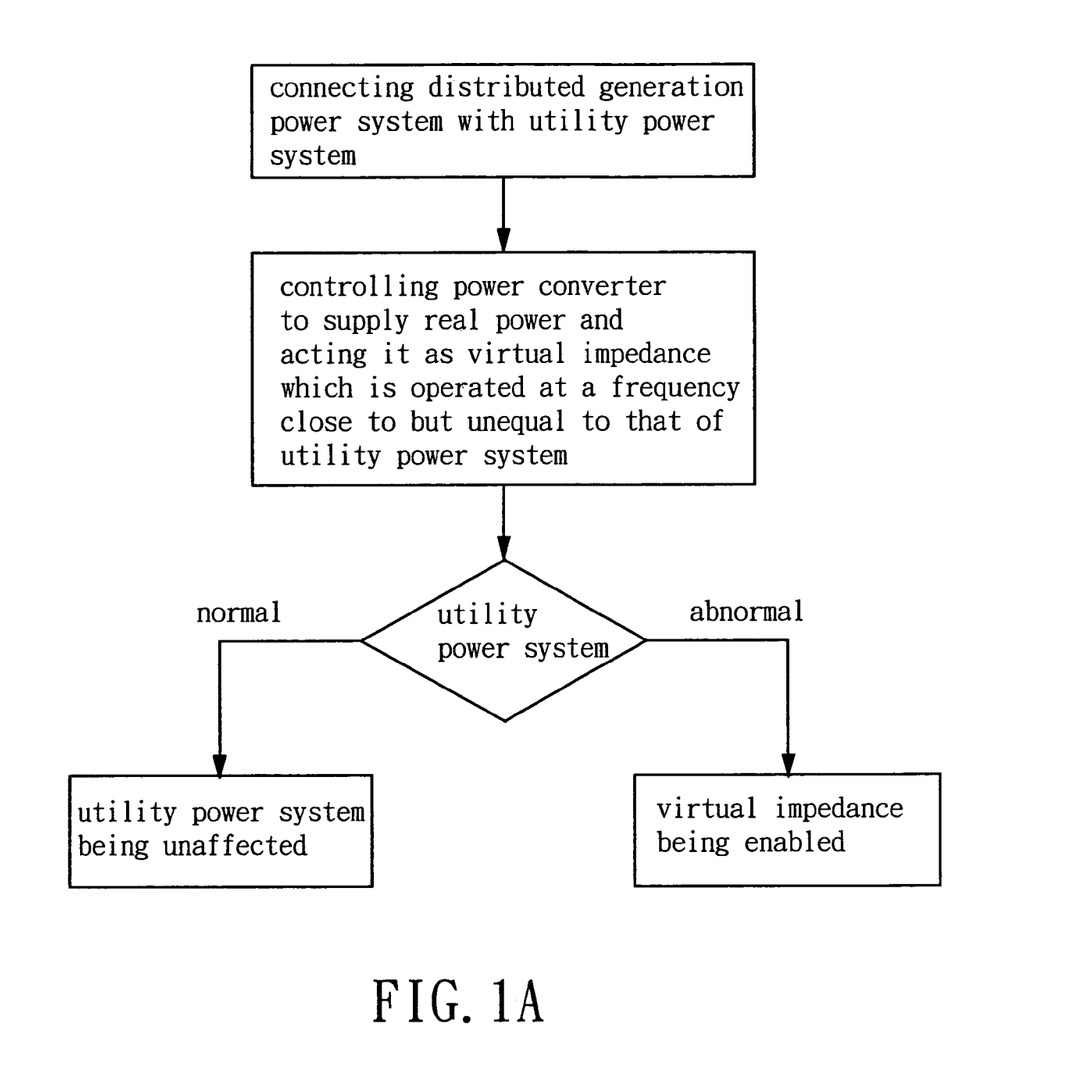
FIG. 1A is a flow chart illustrating an islanding detection method for the distributed generation power system in accordance with the present invention.

Turning now to FIG. 1A, a flow chart illustrating an islanding detection method for the distributed generation power system in accordance with the present invention is illustrated. The islanding detection method for the distributed generation power system includes the steps of: connecting a utility power system with a distributed generation power system; controlling the power converter of the distributed generation power system to supply a real power and to act as a virtual capacitor or inductor under abnormal condition of the utility power system, the virtual capacitor or inductor is operated at a frequency close to but unequal to that of the utility power system; when the utility power system is normal, the virtual capacitor or inductor of the distributed generation power system is ineffective and the power converter still supplies the real power; and when power failure occurs in the utility power system, the virtual capacitor or inductor of the power converter is enabled.

Figure 2:
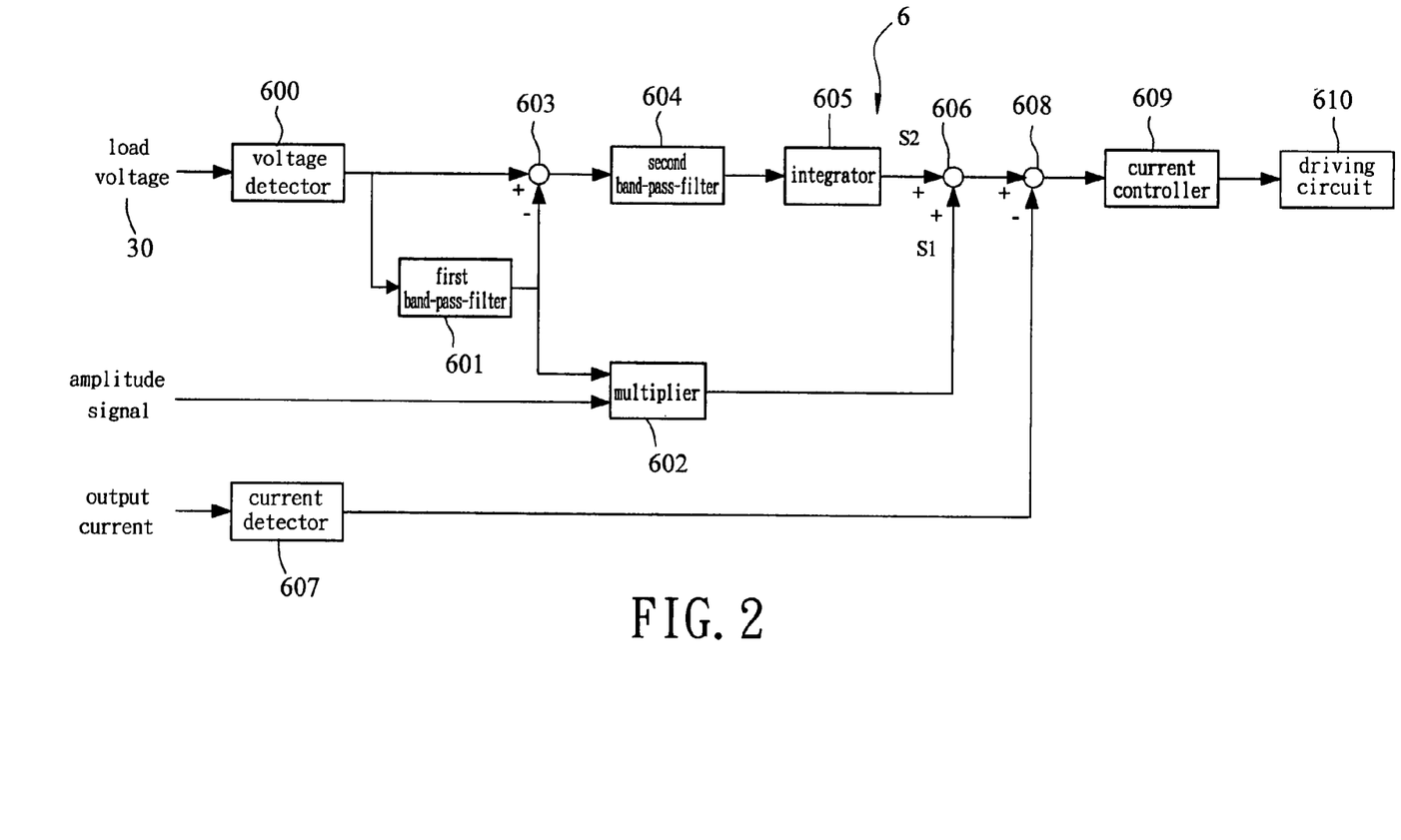
FIG. 2 is a control block diagram illustrating an islanding detection apparatus for the distributed generation power system in accordance with a first embodiment of the present invention.

Turning now to FIG. 2, a block diagram of the islanding detection apparatus for the distributed generation power system in accordance with a first embodiment of the present invention is illustrated. Referring to FIGS. 1 and 2, the power converter 21 of the distributed generation power system 2 acts as a virtual inductor during the interruption of the utility power system 1. In this manner, the operating frequency of the power converter 21 is close to and slightly higher than that of the utility power system 1 to detecting the islanding phenomenon.

Still referring to FIG. 2, constructions of the islanding detection apparatus 6 shall be described in detail. In the first embodiment, the islanding detection apparatus 6 includes a voltage detector 600, a first band-pass-filter 601, a multiplier 602, a first subtracter 603, a second band-pass-filter 604, an integrator 605, an adder 606, a current detector 607, a second subtracter 608, a current controller 609 and a driving circuit 610.

Still referring to FIGS. 1 and 2, the power converter 21 adopts a current-mode control which employs reference signals including a real-power control signal S1 and a virtual-inductor control signal S2. In the first embodiment, the real-power control signal S1 can determine an amount of the real power supplied from the distributed generation power system 2. Preferably, the real-power control signal S1 is a sine-wave signal whose frequency and phase are identical with those of a voltage of the utility power system 1. Initially, the load voltage 30 is detected by the voltage detector 600 and sent it to the first band-pass-filter 601. In a preferred embodiment, the first band-pass-filter 601 has a center frequency the same with a fundamental frequency of the utility power system 1. An output of the first band-pass-filter 601 is selected from a sine-wave signal whose frequency and phase are identical with a voltage of the utility power system 1. The output of the first band-pass-filter 601 is multiplied by an amplitude signal in the multiplier 602 so as to obtain the real-power control signal S1. In operation, the real-power control signal S1 is used to control a real power generated from the distributed generation power system 2 while the amplitude signal is determined by the magnitude of energy generated from the DC power source 20.

Still referring to FIGS. 1 and 2, in the first embodiment, the virtual-inductor control signal S2 is used to operate the power converter 21 as a virtual inductor. The operating frequency of the virtual inductor is close to and slightly higher than that of the utility power system 1 for detecting the islanding phenomenon. The load voltage 30 detected by the voltage detector 600 and the output of the first band-pass-filter 601 are sent to the first subtracter 603, and the results of the first subtracter 603 are components of the load voltage 30 whose frequency unequal to the fundamental frequency of the utility power system 1. Subsequently, the results of the first subtracter 603 are sent to the second band-pass-filter 604. In a preferred embodiment, the second band-pass-filter 604 has a center frequency slightly higher than the fundamental frequency of the utility power system 1. Subsequently, an output of the second band-pass-filter 604 is sent to the integrator 605 to thereby generate the virtual-inductor control signal S2.

By referring again to FIG. 2, the real-power control signal S1 and the virtual-inductor control signal S2 are sent to and added in the adder 606 so as to obtain a reference signal for the power converter 21. In the first embodiment, the current detector 607 detects an output current of the power converter 21. Subsequently, outputs of the adder 606 and the current detector 607 are sent to the second subtracter 608, and the result is sent to the current controller 609. Finally, an output of the current controller 609 is sent to the driving circuit 610 to generate driving signals for power electronic switches of the power converter 21.

Referring again to FIGS. 1 and 2, when the utility power system 1 is normal, the load voltage 30 identical with the voltage of the utility power system 1 since the utility power system 1 directly supplies power to the load 3. Since the utility power system 1 is strong enough, the load voltage 30 has a slight change in frequencies and contains a small amount of harmonics. This results in the outputs of the first subtracter 603 and the second band-pass-filter 604 are nearly zero and thus the virtual-inductor control signal S2 is nearly zero. In this circumstance, the reference signals for the power converter 21 are mainly composed of the real-power control signal S1. Namely, when the utility power system 1 is normal, the distributed generation power system 2 only supplies a sine-wave current whose frequency and phase are identical with those of the utility power system 1. Meanwhile, the output currents of the distributed generation power system 2 have a slight amount of total harmonic distortions since the virtual-inductor control signal S2 is nearly zero. Accordingly, when the utility power system 1 is normal, the virtual inductor of the distributed generation power system 2 is ineffective and thus an output current of the distributed generation power system 2 unaffected.

Still referring to FIGS. 1 and 2, conversely, when power failure occurs in the utility power system 1, the strong utility power system 1 is inexistent and no fixed operating frequency of the voltage supplies to the load 3. In this way, the load voltage 30 must be built by the distributed generation power system 2 since there is only the distributed generation power system 2 supplying power to the load 3. Once power failure occurs in the utility power system 1, a transient change of the load voltage 30 occurs. This results in an increase of the output of the second band-pass-filter 604. As the output of the second band-pass-filter 604 increases, the virtual-inductor control signal S2 is also enlarged. Theoretically, a current of inductor can be obtained from an integral of voltage. As a result, the virtual-inductor control signal S2 can control the power converter 21 to generate a current proportional to the integral of components of the load voltage 30 whose frequency unequal to the fundamental frequency of the utility power system 1. In this circumstance, the power converter 21 acts as a virtual inductor connected in parallel with the load 3. This will result in two phenomena that depend on the load characteristic. One phenomenon is to reduce an operating frequency of the load voltage 30. Consequently, the output of the second band-pass-filter 604 and the virtual-inductor control signal S2 are successively amplified such that the behavior of the power converter 21 operated as the virtual inductor can repeatedly be amplified. In this way, the operating frequency of the load voltage 30 can be rapidly shifted toward the vicinity of the central frequency of the second band-pass-filter 604. The other phenomenon is that the load voltage 30 will be significantly changed in amplitudes. Accordingly, the islanding phenomenon of the distributed generation power system 2 is detected immediately and accurately by means of changes of the load voltage in at least one of amplitude and frequency, and then disconnected the utility power system 1. Consequently, it can reduce the detection time of islanding phenomenon and the output current distortion of the distributed generation power system 2, and can increase the operating reliability of the distributed generation power system 2.

Figure 3:
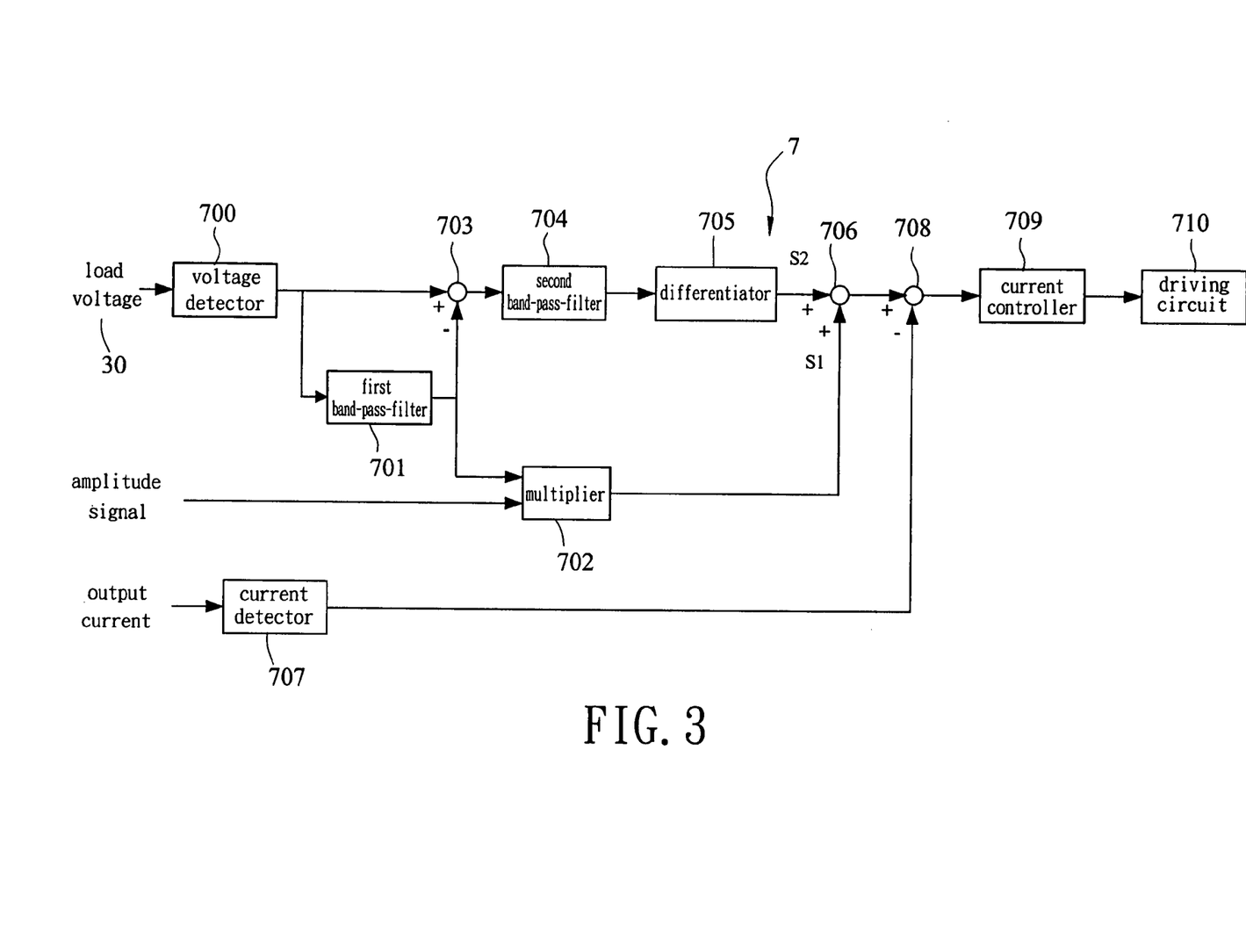
FIG. 3 is a control block diagram illustrating an islanding detection apparatus for the distributed generation power system in accordance with a first embodiment of the present invention.

Turning now to FIG. 3, a block diagram of the islanding detection apparatus for the distributed generation power system in accordance with a second embodiment of the present invention is illustrated. Referring to FIGS. 1 and 3, the generation detection apparatus 7 operates the power converter 21 of the distributed generation power system 2 as a virtual capacitor at a frequency close to and slightly lower than that of a utility power system 1 under abnormal condition of the utility power system 1 to detect the islanding phenomenon.

Still referring to FIG. 3, constructions of the islanding detection apparatus 7 shall be described in detail. In the second embodiment, the islanding detection apparatus 7 includes a voltage detector 700, a first band-pass-filter 701, a multiplier 702, a first subtracter 703, a second band-pass-filter 704, a differentiator 705, an adder 706, a current detector 707, a second subtracter 708, a current controller 709 and a driving circuit 710.

Still referring to FIGS. 1 and 3, the power converter 21 adopts a current-mode control which employs reference signals including a real-power control signal S1 and a virtual-capacitor control signal S2. In the second embodiment, the real-power control signal S1 can determine an amount of the real power supplied from the distributed generation power system 2. Preferably, the real-power control signal S1 is a sine-wave signal whose frequency and phase are identical with those of a voltage of the utility power system 1. Initially, the load voltage 30 is detected by the voltage detector 700 and sent it to the first band-pass-filter 701. In a preferred embodiment, the first band-pass-filter 701 has a center frequency the same with a fundamental frequency of the utility power system 1. An output of the first band-pass-filter 701 is a sine-wave signal whose frequency and phase are identical with those of a voltage of the utility power source 1. The output of the first band-pass-filter 701 is multiplied by an amplitude signal in the multiplier 702 so as to obtain the real-power control signal S1. In operation, the real-power control signal S1 is used to control a real power generated from the distributed generation power system 2 while the amplitude signal is determined by the magnitude of energy generated from the DC power source 20.

Still referring to FIGS. 1 and 3, in the second embodiment, the virtual-capacitor control signal S2 is used to operate the power converter 21 as a virtual capacitor. The operating frequency of the virtual capacitor is close to and slightly lower than that of the utility power system 1 for detecting the islanding phenomenon. The load voltage 30 detected by the voltage detector 700 and the output of the first band-pass-filter 701 are sent to the first subtracter 703, and the results of the first subtracter 703 are components of the load voltage 30 whose frequency unequal to the fundamental frequency of the utility power system 1. Subsequently, the results of the first subtracter 703 are sent to the second band-pass-filter 704. In a preferred embodiment, the second band-pass-filter 704 has a center frequency slightly lower than the fundamental frequency of the utility power system 1. Subsequently, an output of the second band-pass-filter 704 is sent to the differentiator 705 to thereby generate the virtual-capacitor control signal S2.

By referring again to FIG. 3, the real-power control signal S1 and the virtual-capacitor control signal S2 are sent to and added in the adder 706 so as to obtain a reference signal for the power converter 21. In the second embodiment, the current detector 707 detects an output current of the power converter 21. Subsequently, outputs of the adder 706 and the current detector 707 are sent to the second subtracter 708, and the result is sent to the current controller 709. Finally, an output of the current controller 709 is sent to the driving circuit 710 to generate a driving signal for power electronic switches of the power converter 21.

Referring again to FIGS. 1 and 3, when the utility power system 1 is normal, a voltage of the utility power system 1 is identical with the load voltage 30 since the utility power system 1 directly supplies power to the load 3. Since the utility power system 1 is strong enough, the load voltage 30 has a slight change in frequencies, and contains a small amount of harmonics. This results in the outputs of the first subtracter 703 and the second band-pass-filter 704 are nearly zero and thus the virtual-capacitor control signal S2 is nearly zero. In this circumstance, the reference signals for the power converter 21 are mainly composed of the real-power control signal S1. Namely, when the utility power system 1 is normal, the distributed generation power system 2 only supplies a sine-wave current whose frequency and phase are identical with those of the utility power system 1. Meanwhile, the output currents of the distributed generation power system 2 have a slight amount of total harmonic distortions since the virtual-capacitor control signal S2 is nearly zero. Accordingly, when the utility power system 1 is normal, the virtual capacitor of the distributed generation power system 2 is ineffective and thus an output current of the distributed generation power system 2 unaffected.

Still referring to FIGS. 1 and 3, conversely, when power failure occurs in the utility power system 1, the strong utility power source 1 is inexistent and no fixed operating frequency of the voltage supplies to the load 3. In this way, the load voltage 30 must be built by the distributed generation power system 2 since there is only the distributed generation power system 2 supplying power to the load 3. Once power failure occurs in the utility power system 1, a transient change of the load voltage 30 occurs. This results in an increase of the output of the second band-pass-filter 704. As the output of the second band-pass-filter 704 increases, the virtual-capacitor control signal S2 is also enlarged. Theoretically, a current of capacitor can be obtained from a differential of voltage. As a result, the virtual-capacitor control signal S2 can control the power converter 21 to generate a current proportional to the differential of components of the load voltage 30 whose frequency unequal to the fundamental frequency of the utility power system 1. In this circumstance, the power converter 21 acts as a virtual capacitor connected in parallel with the load 3. This will result in two phenomena that depend on the load characteristic. One phenomenon is to decrease an operating frequency of the load voltage 30. Consequently, the output of the second band-pass-filter 704 and the virtual-capacitor control signal S2 are successively amplified such that the behavior of the power converter 21 operated as the virtual capacitor can repeatedly be amplified. In this way, the frequency of the load voltage 30 can be rapidly shifted toward the vicinity of the central frequency of the second band-pass-filter 704. The other phenomenon is that the load voltage 30 will be significantly changed in amplitudes. Accordingly, the islanding operation of the distributed generation power system 2 is detected immediately and accurately by means of changes of the load voltage 30 in amplitude or frequency, and then disconnected the utility power system 1. Consequently, it can reduce the detection time of islanding phenomenon and the output current distortion of the distributed generation power system 2, and can increase the operating reliability of the distributed generation power system 2.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An islanding detection method for a distributed generation power system, comprising the steps of:
    a utility power system connecting with the distributed generation power system, the distributed generation power system including a power converter to connect with the utility power system; and
    controlling the power converter of the distributed generation power system to adopt a current-mode control, to have an output current tracing a reference signal including a real-power control signal and a virtual-capacitor control signal, and to act as a virtual capacitor at a frequency close to but unequal to a fundamental frequency of the utility power system for detecting islanding phenomenon under abnormal conditions of the utility power system;
    wherein when power failure occurs in the utility power system, only the distributed generation power system supplies power to a load such that the virtual capacitor of the power converter is enabled, thereby causing a significant change of a load voltage in at least one of amplitudes and frequencies;
    wherein the step of controlling the power converter to adopt the current-mode control, to have the output current tracing the reference signal including the real-power control signal and the virtual-capacitor control signal, and to act as the virtual capacitor comprises:
    detecting the load voltage by a voltage detector;
    filtering the load voltage by a first band-pass-filter having a center frequency the same with a fundamental frequency of the utility power system, so that an output of the first band-pass-filter is a sine-wave signal with a frequency and a phase identical with a frequency and a phase of a voltage of the utility power system;

multiplying the output of the first band-pass-filter by an amplitude signal in a multiplier to obtain the real-power control signal;

subtracting the output of the first band-pass-filter from the load voltage detected by the voltage detector by a first subtracter and sending the result of the first subtracter to a second band-pass-filter having a center frequency higher than the fundamental frequency of the utility power system;

sending an output of the second band-pass-filter to a differentiator to generate the virtual-capacitor control signal;

adding the real-power control signal and the virtual-capacitor control signal by an adder to obtain the reference signal;

detecting an output current of the power converter by a current detector;

subtracting the output current of the power converter from the reference signal by a second subtracter and sending an output of the second subtracter to a current controller; and sending an output of the current controller to a driving circuit to generate driving signals for power electronic switches of the power converter.

2. The islanding detection method for the distributed generation power system as defined in claim 1, wherein the distributed generation power system further includes a DC power source.

3. The islanding detection method for the distributed generation power system as defined in claim 1, wherein the real-power control signal is selected from a sine-wave signal whose frequency and phase are identical with those of a voltage of the utility power system.

4. The islanding detection method for the distributed generation power system as defined in claim 1, wherein the virtual-capacitor control signal controls the power converter to generate a current proportional to a differential of components of the load voltage whose frequency is unequal to the fundamental frequency of the utility power system.

5. The islanding detection method for the distributed generation power system as defined in claim 1, wherein when the utility power system is normal, the virtual-capacitor control signal is nearly zero such that the reference signal is mainly composed of the real-power control signal; the distributed generation power system only supplies a sine-wave current whose frequency and phase are identical with those of the utility power system.

6. The islanding detection method for the distributed generation power system as defined in claim 1, wherein when the power failure occurs in the utility power system, the virtual-capacitor control signal is not zero; the virtual capacitor of the power converter causes the frequency of the load voltage to be shifted to a frequency lower than the fundamental frequency of the utility power system or the amplitude of the load voltage to be significantly changed.

7. An islanding detection method for a distributed generation power system, comprising the steps of:

a utility power system connecting with the distributed generation power system, the distributed generation power system including a power converter to connect with the utility power system; and controlling the power converter of the distributed generation power system to adopt a current-mode control, to have an output current tracing a reference signal including a real-power control signal and a virtual-inductor control signal, and to act as a virtual inductor at a frequency close to but unequal to a fundamental frequency of the utility power system for detecting islanding phenomenon under abnormal conditions of the utility power system;

wherein when power failure occurs in the utility power system, only the distributed generation power system supplies power to a load such that the virtual inductor of the power converter is enabled, thereby causing a significant change of a load voltage in at least one of amplitudes and frequencies;

wherein the step of controlling the power converter to adopt the current-mode control, to have the output current tracing the reference signal including the real-power control signal and the virtual-inductor control signal, and to act as the virtual inductor comprises:

detecting the load voltage by a voltage detector;

filtering the load voltage by a first band-pass-filter having a center frequency the same with a fundamental frequency of the utility power system, so that an output of the first band-pass-filter is a sine-wave signal with a frequency and a phase identical with a frequency and a phase of a voltage of the utility power system;

multiplying the output of the first band-pass-filter by an amplitude signal in a multiplier to obtain the real-power control signal;

subtracting the output of the first band-pass-filter from the load voltage detected by the voltage detector by a first subtracter and sending the result of the first subtracter to a second band-pass-filter having a center frequency higher than the fundamental frequency of the utility power system;

sending an output of the second band-pass-filter to an integrator to generate the virtual-inductor control signal;

adding the real-power control signal and the virtual-inductor control signal by an adder to obtain the reference signal;

detecting an output current of the power converter by a current detector;

subtracting the output current of the power converter from the reference signal by a second subtracter and sending an output of the second subtracter to a current controller; and sending an output of the current controller to a driving circuit to generate driving signals for power electronic switches of the power converter.

8. The islanding detection method for the distributed generation power system as defined in claim 7, wherein the distributed generation power system further includes a DC power source.

9. The islanding detection method for the distributed generation power system as defined in claim 7, wherein the real-power control signal is selected from a sine-wave signal whose frequency and phase are identical with those of a voltage of the utility power system.

10. The islanding detection method for the distributed generation power system as defined in claim 7, wherein the virtual-inductor control signal controls the power converter to generate a current proportional to an integral result of components of the load voltage whose frequency is unequal to the fundamental frequency of the utility power system.

11. The islanding detection method for the distributed generation power system as defined in claim 7, wherein when the utility power system is normal, the virtual-inductor control signal is nearly zero such that the reference signal is mainly composed of the real-power control signal; the distributed generation power system only supplies a sine-wave current whose frequency and phase are identical with those of the utility power system.

12. The islanding detection method for the distributed generation power system as defined in claim 7, wherein when the power failure occurs in the utility power system, the virtual-inductor control signal is not zero; the virtual inductor of the power converter causes the frequency of the load voltage to be shifted to a frequency higher than the fundamental frequency of the utility power system or the amplitude of the load voltage to be significantly changed.

* * * * *